(12) United States Patent
Miller

(10) Patent No.: US 9,339,901 B2
(45) Date of Patent: May 17, 2016

(54) UNIVERSAL SUPPORT POLES, KITS THEREFOR, AND METHODS RELATED THERETO

(71) Applicant: Stander, Inc., Logan, UT (US)

(72) Inventor: F. Troy Miller, Logan, UT (US)

(73) Assignee: Stander Inc., Logan, UT (US)

(*) Notice: Subject to any disclaimer, the term of this patent is extended or adjusted under 35 U.S.C. 154(b) by 11 days.

(21) Appl. No.: 14/174,679

(22) Filed: Feb. 6, 2014

(65) Prior Publication Data

US 2015/0219272 A1    Aug. 6, 2015

(51) Int. Cl.
*F16M 11/38* (2006.01)
*B23P 19/04* (2006.01)
*A61H 3/00* (2006.01)

(52) U.S. Cl.
CPC . *B23P 19/04* (2013.01); *A61H 3/00* (2013.01); *F16M 11/38* (2013.01); *Y10T 29/49904* (2015.01); *Y10T 29/49947* (2015.01)

(58) Field of Classification Search
CPC ....... F16M 11/24; F16M 11/28; F16M 11/38; B23P 19/04; A61H 3/00; Y10T 29/49947; Y10T 29/49904
See application file for complete search history.

(56) References Cited

U.S. PATENT DOCUMENTS

| | | | |
|---|---|---|---|
| 1,797,911 A | 3/1931 | Goenen et al. | |
| 3,114,154 A | 12/1963 | Laughlin | |
| 3,519,293 A * | 7/1970 | Smith | F16B 7/14 248/200.1 |
| 3,606,402 A * | 9/1971 | Medney | F16L 37/148 285/305 |
| D242,671 S | 12/1976 | Thomas | |
| 4,101,036 A | 7/1978 | Craig | |
| 4,238,164 A * | 12/1980 | Mazzolla | B05C 17/0205 403/109.5 |
| 4,351,348 A * | 9/1982 | Axton | A45B 3/00 135/66 |
| 4,725,027 A | 2/1988 | Bekanich | |
| 4,908,906 A | 3/1990 | Hanna | |
| 4,932,090 A | 6/1990 | Johansson | |
| 5,056,753 A * | 10/1991 | Lunau | A47K 17/02 248/200.1 |
| 5,366,191 A | 11/1994 | Bekanich | |
| 5,516,158 A * | 5/1996 | Watts | E21B 17/042 285/333 |
| 5,586,352 A | 12/1996 | O'Brien et al. | |
| 5,711,555 A | 1/1998 | Leedy | |
| 5,826,847 A * | 10/1998 | Warner | F16B 37/0821 248/200.1 |
| 5,876,147 A * | 3/1999 | Longo | F16B 7/182 16/429 |
| 5,906,284 A | 5/1999 | Hammerstrom et al. | |
| 5,979,854 A | 11/1999 | Lundgren et al. | |
| 6,012,182 A | 1/2000 | Allen et al. | |

(Continued)

FOREIGN PATENT DOCUMENTS

DE    1805421    7/1976

OTHER PUBLICATIONS

HealthCraft Dependa-Bar (istallation instructions); HealthCraft Products Inc., Ottawa, Ontario, Canada. Copyright 2006, 3 pgs., http://www.healthcraftproducts.com.

(Continued)

*Primary Examiner* — Jeanette E Chapman
(74) *Attorney, Agent, or Firm* — Stoel Rives LLP

(57) ABSTRACT

Universal support poles and kits therefor are disclosed herein. The universal support poles and kits may comprise a ceiling mount and a floor mount. The universal support poles and kits may comprise at least three pole members. The pole members may be swage coupled together. Methods of assembling universal support poles are also disclosed herein.

17 Claims, 5 Drawing Sheets

(56) References Cited

U.S. PATENT DOCUMENTS

| | | | | |
|---|---|---|---|---|
| 6,027,987 | A * | 2/2000 | Yamazaki | H01L 21/2022 257/E21.133 |
| 6,068,225 | A | 5/2000 | O'Brien et al. | |
| 6,322,110 | B1 * | 11/2001 | Banker | E21B 17/0423 285/333 |
| D470,581 | S | 2/2003 | Hoernig | |
| D474,281 | S | 5/2003 | Hansen | |
| 6,560,794 | B2 | 5/2003 | Allen et al. | |
| 6,745,785 | B2 * | 6/2004 | Kotovsky | A45B 3/00 135/65 |
| 6,922,857 | B2 | 8/2005 | Palma | |
| 7,124,451 | B2 | 10/2006 | Moore | |
| 7,198,236 | B2 * | 4/2007 | Warner | F16B 7/149 248/125.8 |
| D584,129 | S | 1/2009 | Miller | |
| 7,658,219 | B2 * | 2/2010 | Whittemore | E04G 21/24 160/351 |
| 7,849,564 | B2 | 12/2010 | Miller | |
| 7,874,881 | B1 * | 1/2011 | Sosa | H01R 4/188 439/877 |
| 8,137,243 | B2 * | 3/2012 | Coote | A63B 9/00 248/354.1 |
| 8,827,587 | B2 * | 9/2014 | Didehvar | A47H 1/022 211/105.3 |
| 8,919,387 | B2 * | 12/2014 | Martin | E21B 17/042 138/109 |
| 9,200,732 | B2 * | 12/2015 | Coogan | F16L 17/06 |

OTHER PUBLICATIONS

HealthCraft Dependa-Bar (website download); HealthCraft Products Inc., Ottawa, Ontario, Canada, 7 pgs., http://web.archive.org/web/20051030030453/http://www.healthcraftproducts.com/dependabar.htm Oct. 30, 2005.

Non-Final Office Action issued Mar. 17, 2010 in U.S. Appl. No. 11/653,494.

Notice of Allowance issued Aug. 3, 2010 in U.S. Appl. No. 11/653,494.

Notice of Allowance issued Sep. 8, 2008 in design U.S. Appl. No. 29/303,281.

* cited by examiner

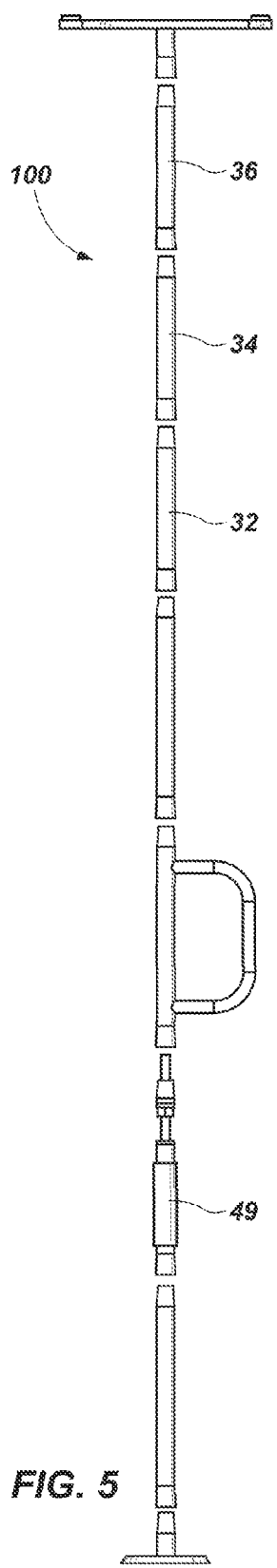
FIG. 5
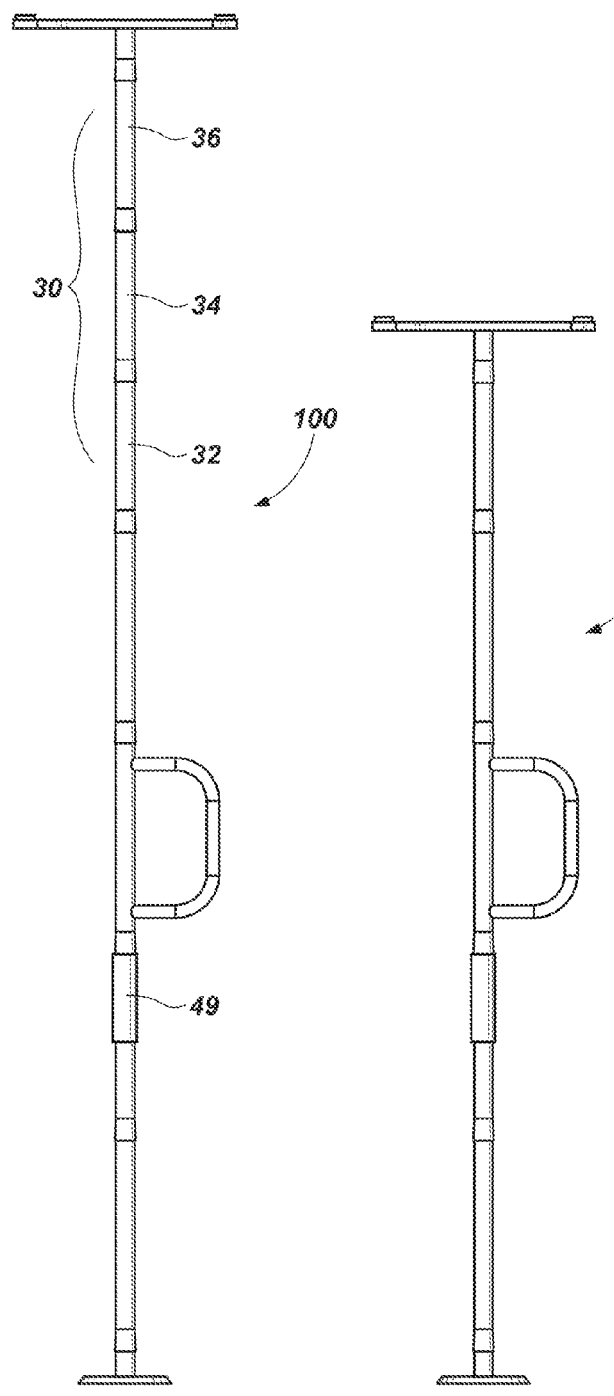
FIG. 6
FIG. 7

UNIVERSAL SUPPORT POLES, KITS THEREFOR, AND METHODS RELATED THERETO

TECHNICAL FIELD

The present disclosure relates generally to mobility assistance devices. More specifically, the present disclosure relates to universal support poles, kits therefor, and methods related thereto.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

FIG. 5 illustrates an unassembled view of the embodiment of FIG. 1 shown with components capable of fitting about a nine-foot ceiling.

FIG. 6 illustrates an assembled view of the embodiment of FIG. 5.

FIG. 7 illustrates an assembled view of the embodiment of FIG. 1 with components for about a seven-foot ceiling.

DETAILED DESCRIPTION

Figure 1:
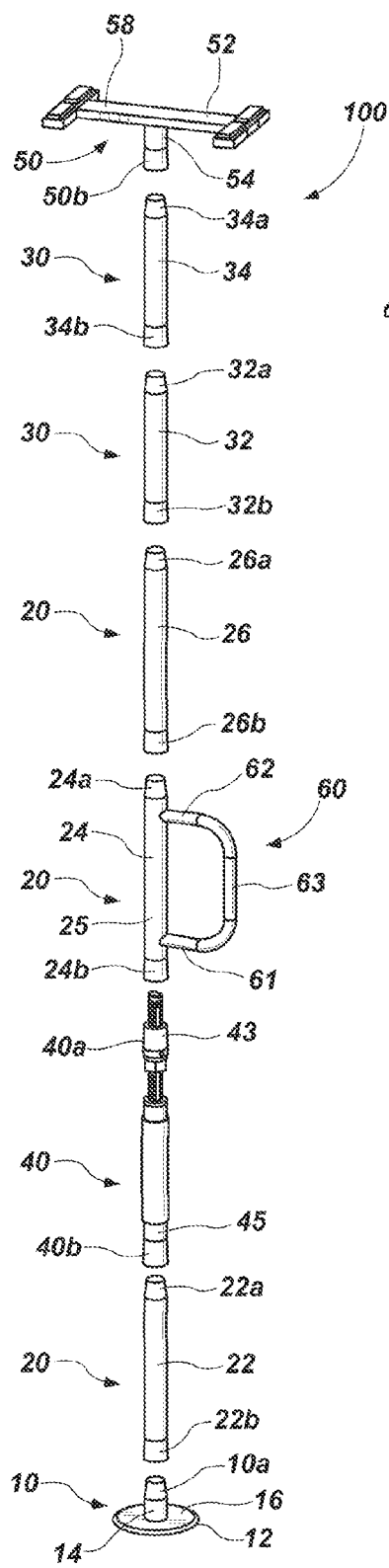
FIG. 1 illustrates an unassembled view of one embodiment of a support pole shown with components capable of fitting about an eight-foot ceiling.

Universal support poles, kits therefor, and methods related thereto are disclosed herein. It will be readily understood that the components of the embodiments as generally described below and illustrated in the figures herein could be arranged and designed in a wide variety of different configurations. Thus, the following more detailed description of various embodiments, as described below and represented in the figures, is not intended to limit the scope of the disclosure, but is merely representative of various embodiments. While the various aspects of the embodiments are presented in drawings, the drawings are not necessarily drawn to scale unless specifically indicated.

The phrases "operably connected to," "connected to," and "coupled to" refer to any form of interaction between two or more entities, including mechanical, electrical, magnetic, electromagnetic, fluid, and thermal interaction. Two entities may interact with each other even though they are not in direct contact with each other. For example, two entities may interact with each other through an intermediate entity, unless specified as directly interacting.

In some embodiments of a support pole, the support pole comprises a floor mount, a ceiling mount, and three pole members swage coupled to each other and to the floor mount and the ceiling mount.

In some embodiments of a support pole, the support pole comprises a floor mount coupled to a first cylindrical member. The support pole may further comprise an adjustable cylindrical member coupled to the first cylindrical member. The support pole may further comprise a second cylindrical member coupled to the adjustable cylindrical member. The support pole may further comprise a third cylindrical member coupled to the second cylindrical member. The support pole may further comprise a fourth cylindrical member coupled to the third cylindrical member. The support pole may further comprise a ceiling mount coupled to the fourth cylindrical member.

In some embodiments of a support pole kit, the kit comprises a floor mount comprising a base portion configured to lay on a floor surface. The kit may further comprise first, second, and third pole members having a same length. The kit may further comprise fourth, fifth, and sixth pole members having a same length. The kit may also comprise an adjustable pole member comprising an adjustable coupling surface at one end and a fixed coupling surface at the other end. The kit may further comprise a ceiling mount comprising a base portion configured to press against a ceiling surface. The floor mount may be configured to be coupled to any of the pole members. The ceiling mount may be configured to be coupled to any of the pole members. Each of the pole members may be configured to be coupled to each other and to the floor mount and ceiling mount.

In some embodiments of a support pole kit, the kit comprises a floor mount comprising a base portion configured to lay on a floor surface, which may further comprise a tubular member extending from the upper surface of the base portion. The tubular member may be configured to be oriented perpendicular to a floor surface. The kit may further comprise first, second, and third cylindrical members having the same length and fourth, fifth, and sixth cylindrical members having the same length. The kit may further comprise an adjustable cylindrical member comprising an adjustable coupling surface at one end and a fixed coupling surface at the other end. The ceiling mount may comprise a base portion configured to press against a ceiling surface and may further comprise a tubular member extending from the lower surface of the base portion. The tubular member may be configured to be oriented perpendicular to a ceiling surface. The tubular member of the floor mount may be configured to be coupled to any of the cylindrical members. Likewise, the tubular member of the ceiling mount may be configured to be coupled to any of the cylindrical members. Each of the cylindrical members may be configured to be coupled to each other and to the tubular members of the floor mount and ceiling mount.

In some embodiments of a method of assembling a support pole, the method comprises placing a floor mount on a floor in a location where an assembled support pole is desired. The method may further comprise coupling without a need for screws a first pole member to the floor mount. The method may further comprise coupling without a need for screws an adjustable pole member to the first pole member. The method may further comprise coupling without a need for screws a second pole member to the adjustable pole member. The method may further comprise coupling without a need for screws a third pole member to the second pole member. The method may further comprise coupling without a need for screws a fourth pole member to the third pole member. The method may further comprise coupling without a need for screws a ceiling mount to the fourth pole member.

In some embodiments of a method of assembling a support pole by a single individual in only sitting and standing positions, the method comprises coupling without a need for screws a first pole member to a floor mount, wherein the floor mount is either placed on a floor or table or held with one hand from either a sitting or standing position. The method may further comprise coupling without a need for screws an adjustable pole member to the first pole member, from either a sitting or standing position, and then placing the floor mount on the floor if it was not previously placed there. The method may further comprise coupling without a need for screws a second pole member to the adjustable pole member, from either a standing or a sitting position. The method may further comprise coupling without a need for screws a third pole member to the second pole member from a standing position. The method may further comprise coupling without a need for screws a first shorter pole member to the third pole member from a standing position. The method may further comprise one of the following options: (a) if a distance from the floor to the ceiling where the assembled support pole is desired is about seven feet, then coupling without a need for screws a ceiling mount to the first shorter pole member, from a standing position; (b) if the distance from the floor to the ceiling where the assembled support pole is desired is about eight feet, then coupling without a need for screws a second shorter pole member to the first shorter pole member and then coupling without a need for screws a ceiling mount to the second shorter pole member or coupling without a need for screws the ceiling mount to the second shorter pole member and then coupling without screws the second shorter pole member to the first shorter pole member, all from a standing position; or (c) if the distance from the floor to the ceiling where the assembled support pole is desired is about nine feet, then coupling without a need for screws a second shorter pole member to the first shorter pole member, coupling without a need for screws a third shorter pole member to the second shorter pole member, and then coupling without a need for screws a ceiling mount to the third shorter pole member, all from a standing position.

The figures illustrate one embodiment of a support pole 100. The support pole 100 comprises various components and materials as further detailed below. Additionally, any combination of the individual components may comprise a kit for a support pole.

Figure 2:
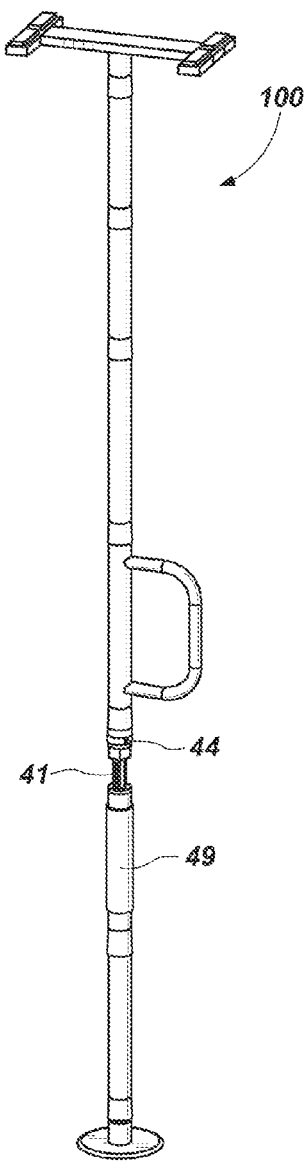
FIG. 2 illustrates an assembled view of the embodiment of FIG. 1 with a slidable sleeve for covering one embodiment of adjustment mechanisms for adjusting the height and securing the position of the illustrated support pole.
Figure 3:
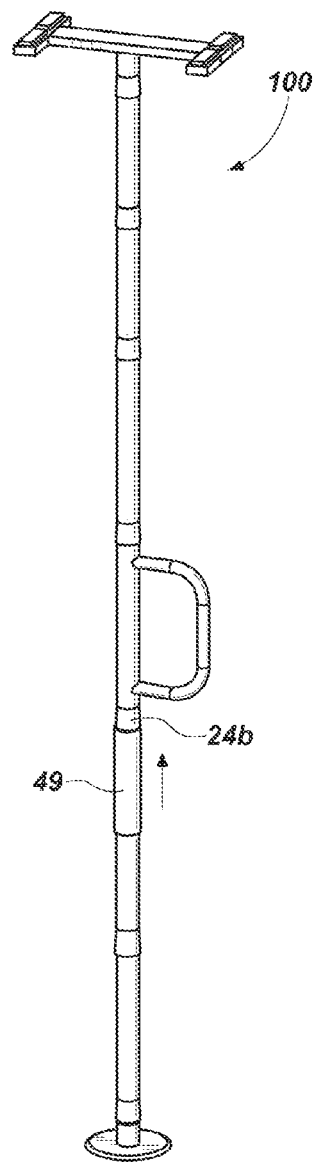
FIG. 3 also illustrates an assembled view of the embodiment of FIG. 1, but with the slidable sleeve covering the illustrated embodiment of the adjustment mechanisms.
Figure 4:
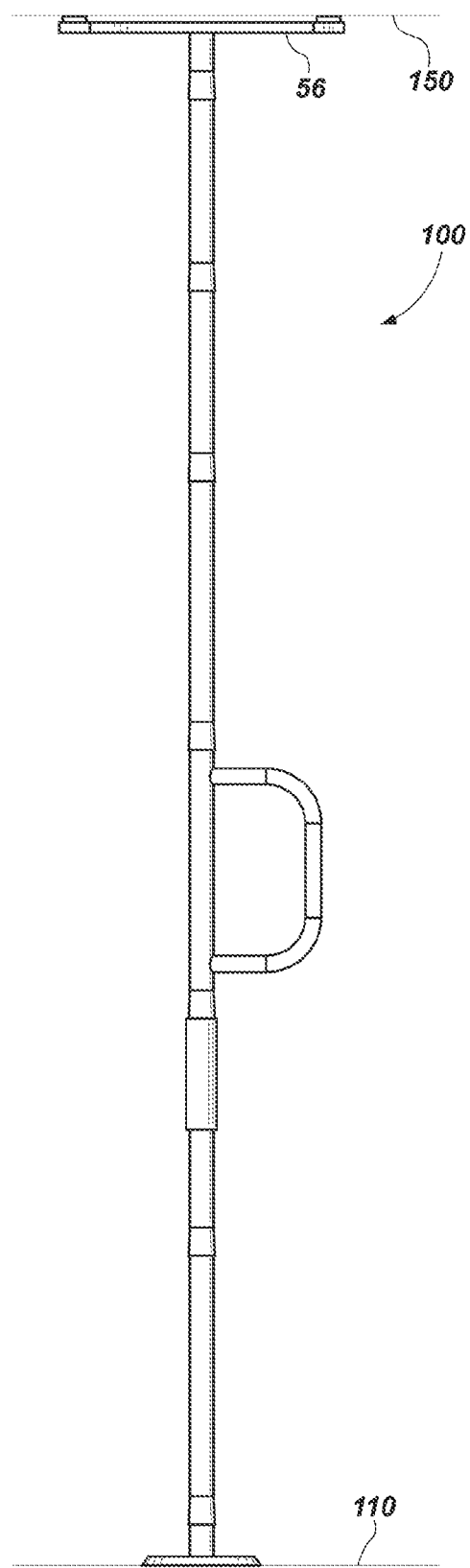
FIG. 4 illustrates an assembled view of the embodiment of FIG. 1 engaged with a floor surface and a ceiling surface of about an eight-foot ceiling.

FIG. 1 illustrates an unassembled view of the support pole 100 shown with components capable of fitting an eight-foot ceiling. FIGS. 2 and 3 illustrate assembled views of the support pole 100 and will be discussed more below. FIG. 4 illustrates an assembled view of the support pole 100 engaged with a floor surface 110 and a ceiling surface 150, where the ceiling surface 150 is about eight feet from the floor surface 110. The support pole 100 comprises a floor mount 10 comprising a base portion 12 configured to lay on a floor surface 110 (see FIG. 4) and further comprising a tubular member 14 extending from an upper surface 16 of the base portion 12. The tubular member 14 is configured to be oriented perpendicular to the floor surface 110. The support pole 100 further comprises three pole members 20 (first pole member 22, second pole member 24, and third pole member 26) having the same length and two shorter pole members 30 (fourth pole member 32 and fifth pole member 34) having the same length.

In the illustrated embodiment, the pole members 20 are longer than the shorter pole members 30.

The support pole 100 further comprises an adjustable pole member 40 having about the same length as a pole member 20. The adjustable pole member 40 further comprises an adjustable coupling surface 43 at one end and a fixed coupling surface 45 at the other end. The distance between the adjustable coupling surface 43 and the fixed coupling surface 45 is adjustable by an amount equal to or less than about half of a length of a shorter pole member 30.

The support pole 100 further comprises a ceiling mount 50 comprising a base portion 52 configured to press against a ceiling surface 150 (see FIG. 4) and further comprising a tubular member 54 extending from a lower surface 56 (see FIG. 4) of the base portion 52. The tubular member 54 is configured to be oriented perpendicular to the ceiling surface 150.

The tubular member 14 of the floor mount 10 is configured to be coupled to any of the pole members 20, 30, and 40. The tubular member 54 of the ceiling mount 50 is configured to be coupled to any of the pole members 20, 30, and 40. Additionally, each of the pole members 20, 30, and 40 are configured to be coupled to each other and to the tubular member 14 of the floor mount 10 and to the tubular member 54 of the ceiling mount 50.

In the illustrated embodiment, the second pole member 24 comprises a handle 60 attached to an outer surface 25 thereof. In alternative embodiments, a handle is not present. In the illustrated embodiment, the handle 60 is fixed in position when the second pole member 24 is coupled to other pole members 20, 30, or 40. Alternatively, the handle 60 may be pivotable when the second pole member 24 is coupled to other pole members 20, 30, or 40. For example, a pivot mechanism such as that disclosed in U.S. Pat. No. 7,849,564, the contents of which are incorporated herein by reference, may be used to make handle 60 pivotable.

Turning again to the illustrated embodiment, the handle 60 comprises a "C" shape. The "C" shape is formed by a lower horizontal member 61 extending outward from the outer surface 25 and an upper horizontal member 62 extending outward from the outer surface 25. A lower portion of a vertical member 63 is curvedly connected to an outer portion of the lower horizontal member 61. An upper portion of the vertical member 63 is curvedly connected to an outer portion of the upper horizontal member 62. The lower horizontal member 61 and the upper horizontal member 63 each comprise a straight portion having a length about equal to the width of an average adult palm of a hand, or about 3 to about 4 inches. The vertical member 63 comprises a straight portion having a length about equal to twice the width of an average adult palm of a hand or about 6 to about 8 inches.

In the illustrated embodiment, swage (i.e., compression of one member and expansion of another) is used to couple the pole members 20, 30, and 40 to each other and to the tubular member 14 of the floor mount 10 and to tubular member 54 of the ceiling mount 50. In the illustrated embodiment, the tubular member 14 comprises a tapered end 10a. The first pole member 22 comprises a tapered end 22a and a flared end 22b. The second pole member 24 comprises a tapered end 24a and a flared end 24b. The third pole member 26 comprises a tapered end 26a and a flared end 26b. The fourth pole member 32 comprises a tapered end 32a and a flared end 32b. The fifth pole member 34 comprises a tapered end 34a and a flared end 34b. The adjustable pole member 40 comprises a tapered end 40a and a flared end 40b. The tubular member 54 comprises a flared end 50b. Each tapered end is configured to frictionally engage with a flared end. Swage occurs as a tapered end is forced into a flared end and the tapered end is at least slightly compressed and the flared end is at least slightly expanded. One benefit of swage is that it may increase the sturdiness and stability of the support pole 100, as compared to support pole components that are coupled other ways. Likewise, swage may prevent rotation of support pole 100 components as the tapered end 40a of the adjustable pole member 40 is longitudinally extended.

In some embodiments, any method of coupling without a need for screws, including, but not limited to swage, may be used to couple the pole members 20, 30, and 40 to each other and to the tubular member 14 of the floor mount 10 and to tubular member 54 of the ceiling mount 50.

In the illustrated embodiment, the pole members 20, 30, and 40 are configured to have a smooth surface when assembled into the support pole 100. "Smooth surface," as used herein, means a surface free of abrasive edges, such as caused by bolt or screw heads. A "smooth surface" may be an irregular surface as long as it is non-abrasive. For example, in the illustrated embodiment, support pole 100 will have edges where each of the flared ends terminate; however, these edges are non-abrasive. In other embodiments, the pole members 20, 30, and 40 may be coupled in other ways that result in a smooth surface. Alternatively, the pole members 20, 30, and 40 may be coupled together in a way that does not result in a smooth surface.

In the illustrated embodiment, the pole members 20, 30, and 40 are generally cylindrically shaped. It should be understood that the pole members 20, 30, and 40 may have a variety of shapes and regular or irregular surfaces.

Figure 8:
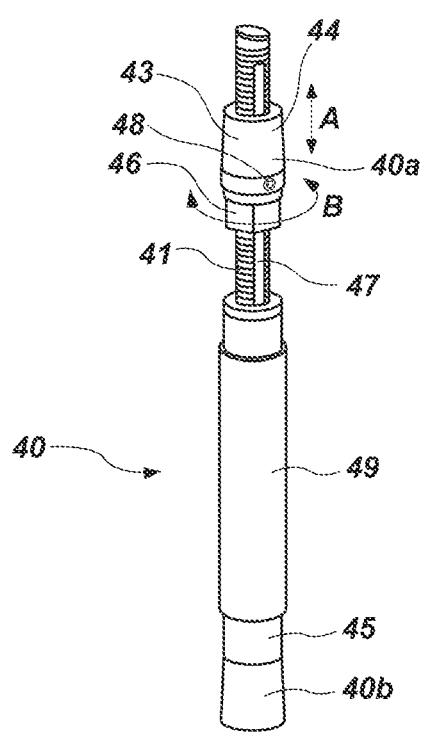
FIG. 8 illustrates operation of the adjustment mechanisms illustrated in FIG. 1.

FIG. 8 illustrates operation of the adjustable pole member 40. In the illustrated embodiment, the adjustable coupling surface 43 comprises a tapered bushing 44 with the outer surface thereof functioning as the tapered end 40a. The adjustable pole member 40 comprises a threaded shaft 41 at one end with a length equal to about half of a length of a shorter pole member 30. The tapered bushing 44 comprises an inner bore configured to circumscribe the threaded shaft 41. The tapered bushing 44 is located on the threaded shaft 41. The adjustable pole member 40 further comprises a nut 46 threaded onto the threaded shaft 41 and configured to longitudinally adjust (Directional Arrow A) the position of the tapered bushing 44 as the nut 46 is threadably advanced or retracted (Rotational Arrow B) along the threaded shaft 41.

The threaded shaft 41 further comprises a flattened face 47 extending longitudinally along at least a portion of the threaded shaft 41. The flattened face 47 is configured to interact with a set screw 48 located in the tapered bushing 44 and configured to secure the location of the tapered bushing 44 on the threaded shaft 41. In the illustrated embodiment, the adjustable pole member 40 further comprises a slidable sleeve 49 configured to conceal the threaded shaft 41 and any portion of the tapered bushing 44 not covered by the flared end 24b of the second pole member 24. FIG. 2 illustrates support pole 100 assembled with the slidable sleeve 49 not covering the threaded shaft 41. FIG. 3 illustrates support pole 100 assembled and with the slidable sleeve 49 slid over the threaded shaft 41 and the portion of the tapered bushing 44 not engaged with the flared end 24b.

FIG. 5 illustrates an unassembled view of the support pole 100 shown with the components capable of fitting a nine-foot ceiling. FIG. 5 illustrates a sixth pole member 36. FIG. 6 illustrates the support pole 100 assembled with three shorter pole members 30 (fourth pole member 32, fifth pole member 34, and sixth pole member 36) for a nine-foot ceiling. FIG. 6 also illustrates the slidable sleeve 49 slid upwards to cover the threaded shaft 41. FIG. 7 illustrates an assembled view of the support pole 100 configured for about a seven-foot ceiling with only the one shorter pole member 30 (fourth pole member 32).

One advantage of the support pole 100 is that the support pole may be used with a wide variety of ceiling heights, ranging from six-foot ceilings to twelve-foot ceilings. For a six-foot ceiling, no shorter pole members 30 may be used, for a seven-foot ceiling, one shorter pole member 30 may be used, with additional shorter pole members 30 used for each additional foot of ceiling height. For example, a twelve-foot ceiling would use six shorter pole members 30.

In the illustrated embodiment, the support pole 100 is assembled with pole members 20, 30, and 40 in the same order, regardless of how many shorter pole members 30 are used. Alternatively, the support pole 100 may be assembled with the pole members 20, 30, and 40 in any order desired.

In the illustrated embodiment, the pole members 20 and the adjustable pole member 40 are each configured to have a length of about 16 to about 18 inches and a diameter of about 1.5 inches to about 2 inches.

In the illustrated embodiment, the shorter pole members 30 are each configured to have a length of about 12 inches to about 13 inches and a diameter of about 1.5 inches to about 2 inches.

In the illustrated embodiment, the tubular members 14 and 54, of the floor mount 10 and ceiling mount 50, respectively, are each configured to have a length of about 3 inches.

In the illustrated embodiment, the base portion 52 of the ceiling mount 50 comprises a support beam 58 with cross braces. In the illustrated embodiment, the length of the base portion 50 is about equal to or less than the length of the pole members 20. In the illustrated embodiment, the width of the base portion at its widest is about 8.5 inches.

In some embodiments, components of the support pole 100 capable of fitting a nine-foot ceiling are supplied in a kit. One of the advantages of the support pole 100 is that the component parts may be packaged in a manner that minimizes the retail shelf space utilized. Every cubic foot, and in particular the horizontal dimension visible to customers, of retail shelf space presents a finite opportunity for a retailer to make money. A retailer only has so much shelf space and even less space visible to customers. Support poles for an eight- or nine-foot ceiling that utilize three segments or less have to be packaged in boxes that are generally more than two feet in length, and potentially even three feet long or more. Such boxes are generally stacked horizontally on a retail shelf, requiring a retailer to dedicate two or three feet of retail shelf space to that single product. A retailer selling such a support pole has to have enough of a profit margin on that product to justify dedicating such an extensive amount of shelf space, which in turn may make the product more expensive to consumers.

Figure 9:
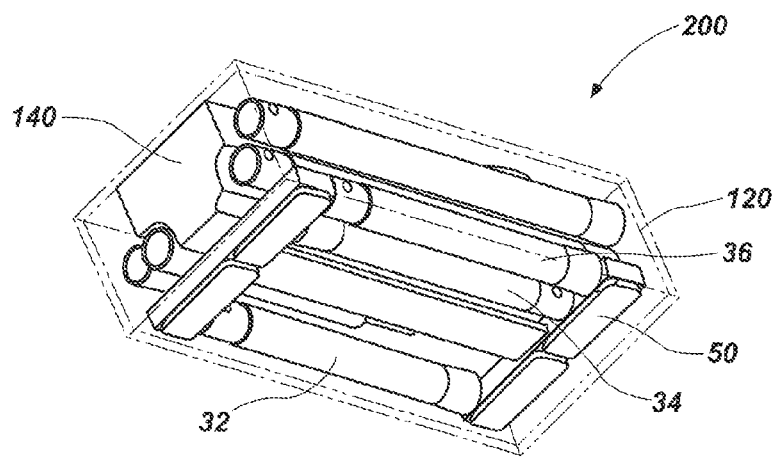
FIG. 9 illustrates a perspective view of one embodiment of a packaged support pole kit from underneath the kit with the outer packaging material shown in phantom.
Figure 10:
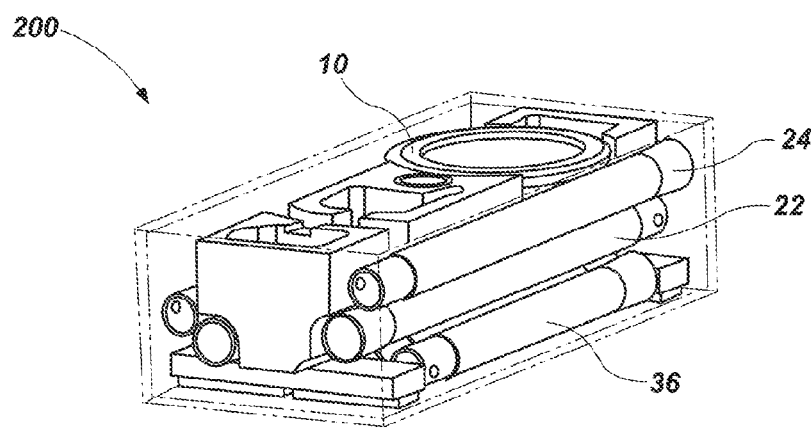
FIG. 10 illustrates a perspective view of the same embodiment of FIG. 9, but from above and showing two of the sides.
Figure 11:
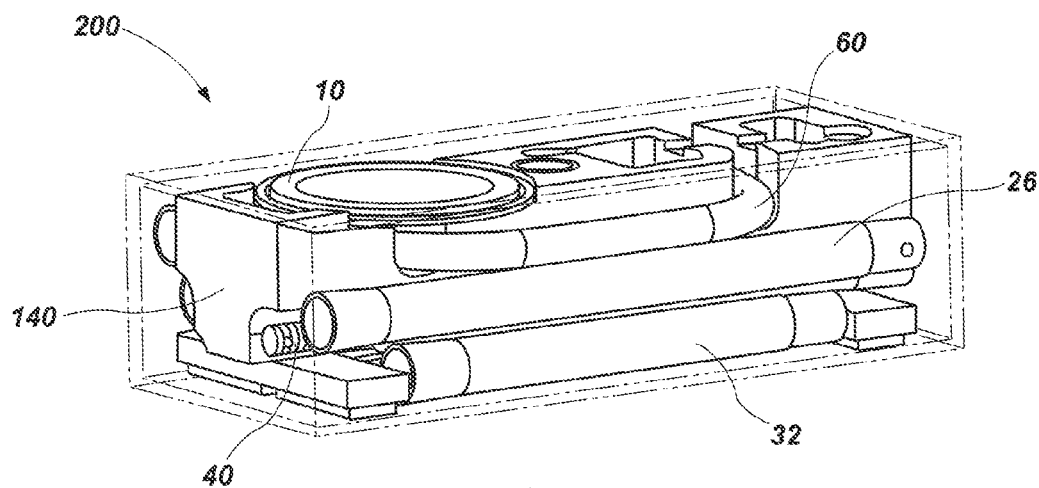
FIG. 11 illustrates a perspective view from above similar to FIG. 10, but showing the other two sides.

FIGS. 9-11 illustrate one embodiment of a kit 200 for the support pole 100. FIG. 9 illustrates a perspective view of one embodiment of a packaged kit 200 from underneath the kit 200 with the outer packaging material shown in phantom. FIG. 10 illustrates a perspective view of the same embodiment of FIG. 9, but from above and showing two of the sides. Likewise, FIG. 11 illustrates a perspective view from above, but showing the other two sides.

In the illustrated embodiment of the kit 200, the kit 200 may be packaged in a box 120 having a length about equal to the length of the pole members 20. The box 120 may have a width about equal to a width of the widest portion of the base portion 52 of the ceiling mount 50. The box 120 may have a height about equal to three times the width of the pole members 20. Thus, the box 120, including packaging materials, may have a length of about 20.5 inches, a width of about 9 inches, and a height of about 6 inches.

In FIGS. 9-11, the ceiling mount 50 is located at the bottom of the box 120. The three shorter pole members 30 (32, 34, and 36) are placed between the cross braces of the ceiling mount 50. In the illustrated embodiment, a foam insert 140 is used to secure the location of the different parts of the kit 200. Pole members 22 and 24 are located on one side of the foam insert 140. The pole member 26 and the adjustable pole member 40 are located on the other side of the foam insert 140. The floor mount 10 is inverted and resting on an upper surface of the foam insert 140. The tubular member 14 inserted through the space circumscribed by the handle 60.

Utilizing the illustrated embodiment, for standard retail shelves having a depth of 18 to 24 inches, the box 120 for the kit 200 may be oriented perpendicular to the horizontal retail shelf surface, instead of parallel to it. Accordingly, a retailer may only need to dedicate about 9 inches of retail horizontal shelf space for a single column of stacked boxes 120 of the kits 200. Accordingly, the opportunity costs of such kits 200 will be lower than for support pole kits that have to be stored horizontally on a retail shelf.

In some embodiments, the support pole 100 and kits therefor may further comprise three additional shorter pole members 30 so that the support pole 100 may be used with a twelve-foot ceiling. Of course, one or two additional shorter pole members 30 could be used for ten- and eleven-foot ceilings, respectively. In some embodiments, kits with three additional shorter pole members 30 could be packaged in boxes that have the same length and width as the boxes 120, but would be taller. Alternatively, the extra shorter pole members 30 could be packaged in a separate box.

It should be understood that FIGS. 9-11 illustrate only one embodiment of how the support pole 100 components may be packaged. Any number of other packaging configurations may also be used.

In some embodiments of a method of assembling the support pole 100, the method comprises placing the floor mount 10 on the floor surface 110 in a location where an assembled support pole 100 is desired. The method may further comprise coupling without a need for screws a first pole member 22 to the floor mount 10, coupling without a need for screws the adjustable pole member 40 to the first pole member 22, coupling without a need for screws the second pole member 24 to the adjustable pole member 40, coupling without a need for screws a third pole member 26 to the second pole member 24, and then coupling without a need for screws a fourth pole member 32 to the third pole member 26. The method may further comprise coupling without a need for screws the ceiling mount 50 to the fourth pole member 32.

For about a seven-foot ceiling, coupling without the need for screws the ceiling mount to the fourth pole member may comprise directly coupling a tubular member 54 of the ceiling mount 50 to the fourth pole member 32.

For about an eight-foot ceiling, coupling without the need for screws the ceiling mount to the fourth pole member may comprise coupling the fifth pole member 34 between the tubular member 54 of the ceiling mount 50 and the fourth pole member 32.

For about a nine-foot ceiling, coupling without the need for screws the ceiling mount to the fourth pole member may comprise coupling the fifth pole member 34 and the sixth pole member 36 between the tubular member 54 of the ceiling mount 50 and the fourth pole member 32.

For about a ten-foot ceiling, coupling without the need for screws the ceiling mount to the fourth pole member may comprise coupling the fifth pole member 34, the sixth pole member 36, and a seventh pole member (a fourth shorter pole member 30) between the tubular member 54 of the ceiling mount 50 and the fourth pole member 32.

For about an eleven-foot ceiling, coupling without the need for screws the ceiling mount to the fourth pole member may comprise coupling the fifth pole member 34, the sixth pole member 36, a seventh pole member (a fourth shorter pole member 30), and an eighth pole member (a fifth shorter pole member 30) between the tubular member 54 of the ceiling mount 50 and the fourth pole member 32.

For about a twelve-foot ceiling, coupling without the need for screws the ceiling mount to the fourth pole member may comprise coupling the fifth pole member 34, the sixth pole member 36, a seventh pole member (a fourth shorter pole member 30), an eighth pole member (a fifth shorter pole member 30), and a ninth pole member (a sixth shorter pole member 30) between the tubular member 54 of the ceiling mount 50 and the fourth pole member 32.

The method may further comprise adjusting the height of the adjustable coupling surface 43 of the tapered bushing 44 to elevate any portion of the support pole 100 located above the adjustable pole member 40 and thereby compress the ceiling mount 50 against the ceiling surface 150. The adjusting step may be performed by a single person sitting on a chair using a wrench to rotate nut 46 and then an Allen wrench (i.e., hex wrench) to tighten set screw 48 against flattened face 47.

The support pole 100 may often be used by individuals with limited mobility. Often, for such individuals, kneeling on the floor or bending over to assemble support pole parts lying on the floor would be problematic. One advantage of the illustrated support pole 100 embodiment is that it may be fully assembled without an individual needing to kneel or bend over to touch the floor. Additionally, unlike support poles using screws or bolts that often need to be assembled primarily horizontally to allow for alignment of the screws or bolts with corresponding receiving holes, the support pole 100 may be assembled completely vertically. Therefore, an individual assembling the support pole 100 may not need to assemble the device on a floor.

In some embodiments of a method of assembling the support pole 100, the method is capable of being performed by a single individual in only sitting and standing positions. In such embodiments of the method, portions of the support pole 100 may optionally be assembled horizontally; however, the individual would not have to assemble the entire device horizontally, which could be difficult for a person of limited mobility. Additionally, in this method, the individual would not have to assemble any portion of the device at floor level.

The method may comprise coupling without a need for screws a first pole member 22 to the floor mount 10, wherein the floor mount 10 is either placed on a floor or table or held with one hand from either a sitting or standing position. Next, the floor mount 10 may be placed on the floor if not previously placed there by holding on to the first pole member 22 and lowering the floor mount 10 to the floor, from either a sitting or standing position. Next, the adjustable pole member 40 may be coupled without a need for screws to the first pole member 22, from either a sitting or standing position. Likewise, the second pole member 24 may be coupled without a need for screws to the adjustable pole member 40, from either a standing or sitting position. At this point, a person sitting may want to stand. The third pole member 26 may be coupled without a need for screws to the second pole member 24 from a standing position. From this point on an individual may want to use a step stool or ladder. For about a seven-foot ceiling, the fourth pole member 32 may be coupled without a need for screws to the third pole member 26 and the ceiling mount 50 coupled without a need for screws to the fourth pole member 32, all from a standing position. As discussed previously, additional shorter pole members 30 may be used for higher ceilings. Accordingly, for an eight-foot ceiling, the fifth pole member 34 may be coupled between the fourth pole member 32 and the ceiling mount 50. Likewise, for a nine-foot ceiling, the sixth pole member 36 may also be coupled between the fifth pole member 34 and the ceiling mount 50, all from a standing position.

The method may further comprise adjusting a height of the adjustable coupling surface 43 of the tapered bushing 44 to elevate any portion of the support pole 100 located above the adjustable pole member 40 to thereby compress the ceiling mount 50 against the ceiling. Because of the location of the tapered bushing 44, the adjustment may be from a sitting or standing position by a single individual.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A support pole comprising:
a floor mount;
a ceiling mount;
an adjustable pole member;
three pole members comprising first, second, and third pole members having a same length;
a fourth pole member having a shorter length than the first, second, and third pole members; and
wherein the floor mount comprises either a tapered end or a flared end and the ceiling mount comprises the other of the tapered end or the flared end, wherein the adjustable pole member, the three pole members, and the fourth pole member each comprise a tapered end and a flared end, wherein the floor mount, the ceiling mount, the adjustable pole member, the three pole members, and the fourth pole member, are swage coupled to each other without screws.

2. The support pole of claim 1, wherein the support pole is configured to have a smooth surface.

3. The support pole of claim 1, further comprising a fifth pole member having the same length as the fourth pole member and comprising a tapered end and a flared end and swage coupled to the fourth pole member without screws.

4. The support pole of claim 1, wherein the adjustable pole member comprises an adjustable coupling surface at one end and a fixed coupling surface at the other end.

5. The support pole of claim 3, further comprising a sixth pole member having the same length as the fourth pole member and comprising a tapered end and a flared end and swage coupled to the fifth pole member without screws.

6. A support pole comprising:
the support pole of claim 1, wherein the floor mount comprising a base portion configured to lay on a floor surface;
fourth, fifth, and sixth pole members having a same length;
said adjustable pole member comprising an adjustable coupling surface at one end and a fixed coupling surface at the other end; and
the ceiling mount comprising a base portion configured to press against a ceiling surface,
wherein the floor mount is configured to be coupled to any of the pole members, wherein the ceiling mount is configured to be coupled to any of the pole members, and wherein each of the pole members are configured to be coupled to each other and to the floor mount and ceiling mount.

7. The support pole of claim 1, wherein the second pole member comprises a handle attached to an outer surface thereof.

8. The support pole of claim 7, wherein the handle is fixed in position when the second pole member is coupled to other pole members.

9. The support pole of claim 7, wherein the handle is pivotable when the second pole member is coupled to other pole members.

10. The support pole of claim 1, wherein the adjustable pole member has a length about the same as the first, second, and third pole members.

11. The support pole of claim 1, wherein the adjustable pole member is adjustable by an amount equal to or less than about half of a length of the fourth pole member.

12. The support pole of claim 4, wherein the adjustable coupling surface of the adjustable pole member comprises a tapered bushing configured to function as the tapered end of the adjustable pole member.

13. The support pole of claim 12, wherein the adjustable pole member comprises a threaded shaft at one end with a length equal to or less than about half of a length of the fourth pole member, wherein the tapered bushing comprises an inner bore configured to circumscribe the threaded shaft and the tapered bushing is located on the threaded shaft, wherein the adjustable pole member further comprises a nut threaded onto the threaded shaft and configured to longitudinally adjust the position of the tapered bushing as the nut is threadably advanced or retracted along the threaded shaft.

14. The support pole of claim 13, further comprising a slidable sleeve configured to conceal the threaded shaft and tapered bushing.

15. The support pole of claim 1, wherein the ceiling mount comprises a base portion that comprises a support beam, wherein a length of the base portion is about equal to or less than the length of the first, second, and third pole members.

16. The support pole of claim 1, wherein the support pole is configured to be disassembled and packaged in a box having a length about equal to the length of the first, second, and third pole members, having a width about equal to a width of the base portion of the ceiling mount, and having a height about equal to three times the width of the first pole member.

17. The support pole of claim 6, further comprising three additional shorter pole members.

* * * * *